United States Patent
Jovicic et al.

(10) Patent No.: US 8,942,564 B2
(45) Date of Patent: Jan. 27, 2015

(54) METHODS AND APPARATUS FOR COMMUNICATING INFORMATION USING VISIBLE LIGHT SIGNALS AND/OR RADIO SIGNALS

(71) Applicant: QUALCOMM Incorporated, San Diego, CA (US)

(72) Inventors: Aleksandar Jovicic, Jersey City, NJ (US); Junyi Li, Chester, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 13/671,496

(22) Filed: Nov. 7, 2012

(65) Prior Publication Data

US 2014/0126911 A1      May 8, 2014

(51) Int. Cl.
| | |
|---|---|
| H04J 14/02 | (2006.01) |
| H04B 10/00 | (2013.01) |
| H04B 10/11 | (2013.01) |
| H04B 10/114 | (2013.01) |
| H04B 10/116 | (2013.01) |

(52) U.S. Cl.
CPC ............... *H04B 10/11* (2013.01); *H04J 14/02* (2013.01); *H04B 10/1149* (2013.01); *H04B 10/116* (2013.01)
USPC .................... 398/96; 398/87; 398/88; 398/89; 398/140; 398/156

(58) Field of Classification Search
USPC ............................. 398/96, 140, 156, 87, 88, 89
See application file for complete search history.

(56) References Cited

U.S. PATENT DOCUMENTS

| | | |
|---|---|---|
| 8,004,272 B2 | 8/2011 | Jamieson et al. |
| 8,189,508 B2 | 5/2012 | Park et al. |

(Continued)

FOREIGN PATENT DOCUMENTS

| | | | |
|---|---|---|---|
| GB | 2424777 | * | 4/2006 |
| GB | 2424777 A | | 10/2006 |
| WO | WO-0010270 A1 | | 2/2000 |

OTHER PUBLICATIONS

International Search Report and Written Opinion—PCT/US2013/068926—ISA/EPO—Feb. 25, 2014.

(Continued)

*Primary Examiner* — David Payne
*Assistant Examiner* — Pranesh Barua
(74) *Attorney, Agent, or Firm* — James K. O'Hare

(57) ABSTRACT

A user equipment (UE) device includes a VLC receiver including a photodiode and a radio receiver. The UE device supports a plurality of alternative technologies, communications protocols, and/or frequencies. During a first mode of operation, e.g., a discovery mode, a low reverse bias voltage value is applied to the photodiode. The low reverse bias voltage is adequate to support the recovery of small amounts of communicated information, and the power consumed by the battery of the UE device is relatively low. During discovery, information communicated includes, e.g., a light transmitter ID, an access point ID, services available at the access point, configuration information for a light receiver and/or for an auxiliary radio receiver. During a second mode of operation, e.g., a data traffic mode, the reverse bias voltage applied to the photodiode is set to a high reverse bias voltage to support higher data rate using VLC.

20 Claims, 10 Drawing Sheets

(56) References Cited

U.S. PATENT DOCUMENTS

| | | | |
|---|---|---|---|
| 8,320,768 B2* | 11/2012 | Shin et al. | 398/135 |
| 2007/0147843 A1* | 6/2007 | Fujiwara | 398/118 |
| 2007/0281739 A1* | 12/2007 | Nakagawa | 455/556.1 |
| 2009/0003832 A1* | 1/2009 | Pederson et al. | 398/135 |
| 2010/0209105 A1* | 8/2010 | Shin et al. | 398/58 |
| 2011/0069951 A1* | 3/2011 | Son et al. | 398/17 |
| 2011/0069957 A1* | 3/2011 | Kim et al. | 398/75 |
| 2011/0199918 A1* | 8/2011 | Sampath et al. | 370/252 |
| 2011/0205944 A1* | 8/2011 | Miyabayashi et al. | 370/310 |
| 2011/0243570 A1* | 10/2011 | Kim et al. | 398/140 |
| 2012/0001567 A1 | 1/2012 | Knapp et al. | |
| 2012/0075615 A1* | 3/2012 | Niclass et al. | 356/5.01 |
| 2012/0139941 A1* | 6/2012 | Sakurai et al. | 345/633 |
| 2013/0063082 A1* | 3/2013 | Lee et al. | 320/108 |
| 2013/0126713 A1* | 5/2013 | Haas et al. | 250/208.2 |
| 2013/0154558 A1* | 6/2013 | Lee et al. | 320/108 |
| 2013/0208184 A1* | 8/2013 | Castor et al. | 348/552 |
| 2014/0029494 A1* | 1/2014 | Sundaram et al. | 370/311 |

OTHER PUBLICATIONS

Smith T. et al., "Implications of sleep mode on activation and ranging protocols in PONs", IEEE LEOS Annual Meeting Conference Proceedings : Newport Beach, California, USA, Nov. 9-13, 2008, IEEE, Piscataway, NJ, USA, Nov. 9, 2008, pp. 604-605, XP031366376, ISBN: 978-1-4244-1931-9.

Wong S. et al., "Sleep Mode for Energy Saving PONs: Advantages and Drawbacks", GLOBECOM Workshops, IEEE, Piscataway, NJ, USA, Nov. 30, 2009, pp. 1-6, XP031585758, ISBN: 978-1-4244-5626-0.

* cited by examiner

US 8,942,564 B2

METHODS AND APPARATUS FOR COMMUNICATING INFORMATION USING VISIBLE LIGHT SIGNALS AND/OR RADIO SIGNALS

FIELD

The present application relates to wireless communications and, more particularly, to methods and apparatus for efficiently communicating information using visible light signals and /or radio signals.

BACKGROUND

Visible light communication (VLC) using LED diodes and photodiodes offers the potential for high data rate wireless communication. By some estimates, LEDs will dominate the lighting market of the future and as such will create the opportunity for enabling auxiliary downlink carriers for indoor wireless access.

Typically, a receiver including a photodiode is operated with a fixed reverse bias value to accommodate the highest expected data rates to be used. Although simple to implement, this fixed reverse bias voltage approach can be wasteful in terms of the battery power consumed by the VLC receiver in a mobile device when the amount of data being transmitted is low and/or infrequent.

Based on the above discussion there is a need for new methods and apparatus for efficient receiver operation in environments where different types and/or amounts of data are to be communicated via VLC.

SUMMARY

Various methods and apparatus are directed to communicating information in an efficient manner using visible light communications. Various described methods and apparatus are well suited to an indoor environment. Some methods and apparatus are directed to a user equipment (UE) device, e.g., a mobile wireless terminal, including a first receiver including a photodiode for receiving VLC signals from a VLC transmitter device, and, optionally, including one or more radio receivers. The UE device may support a plurality of alternative technologies, communications protocols, and/or frequencies. Different alternative technologies, communications protocols, and/or frequencies may be used by different access points in the system and/or at different locations.

In some embodiments, during different modes of operation, the reverse bias voltage applied to the photodiode is set to different values to operate the receiver including the photodiode in a power efficient manner. For example, during a first mode of operation, e.g., a discovery mode of operation, a low reverse bias voltage value is applied to the photodiode. The low reverse bias voltage is adequate to support the recovery of small amounts of communicated information, and the power consumed by the battery of the UE device is relatively low. During discovery, communicated information includes, e.g., a light transmitter ID, an access point ID, services available at the access point, configuration information for a light receiver, and/or configuration information for an auxiliary radio receiver. Continuing with the example, during a second mode of operation, e.g., a data traffic mode of operation, the reverse bias voltage applied to the photodiode is set to a high reverse bias voltage to support a higher data rate using VLC. By using a higher reverse bias voltage, the photodiode is able to recover data communicated on a larger bandwidth and/or at a higher data rate than when a low reverse bias voltage is used since the bandwidth and/or dynamic range of the photodiode increases with increased reverse bias voltage. While the increased reverse bias voltage used during some modes, e.g., a data traffic mode, supports higher bandwidth and/or data rates, greater power consumption is associated with the use of the high reverse bias voltage. The use of a low reverse bias voltage allows for discovery to be supported with lower power consumption.

An exemplary method of operating a user equipment (UE) device, in accordance with some embodiments, includes processing an output of a photodiode to detect receipt of an information signal from a light transmitter and in response to detecting receipt of the information signal from the light transmitter, changing from a first mode of device operation to a second mode of device operation, said second mode of device operation being a higher power consumption mode of operation than said first mode of device operation. An exemplary user equipment (UE) device, in accordance with some embodiments, includes at least one processor configured to: process an output of a photodiode to detect receipt of an information signal from a light transmitter and change from a first mode of device operation to a second mode of device operation in response to detecting receipt of the information signal from the light transmitter, said second mode of device operation being a higher power consumption mode of operation than said first mode of device operation. The exemplary UE device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
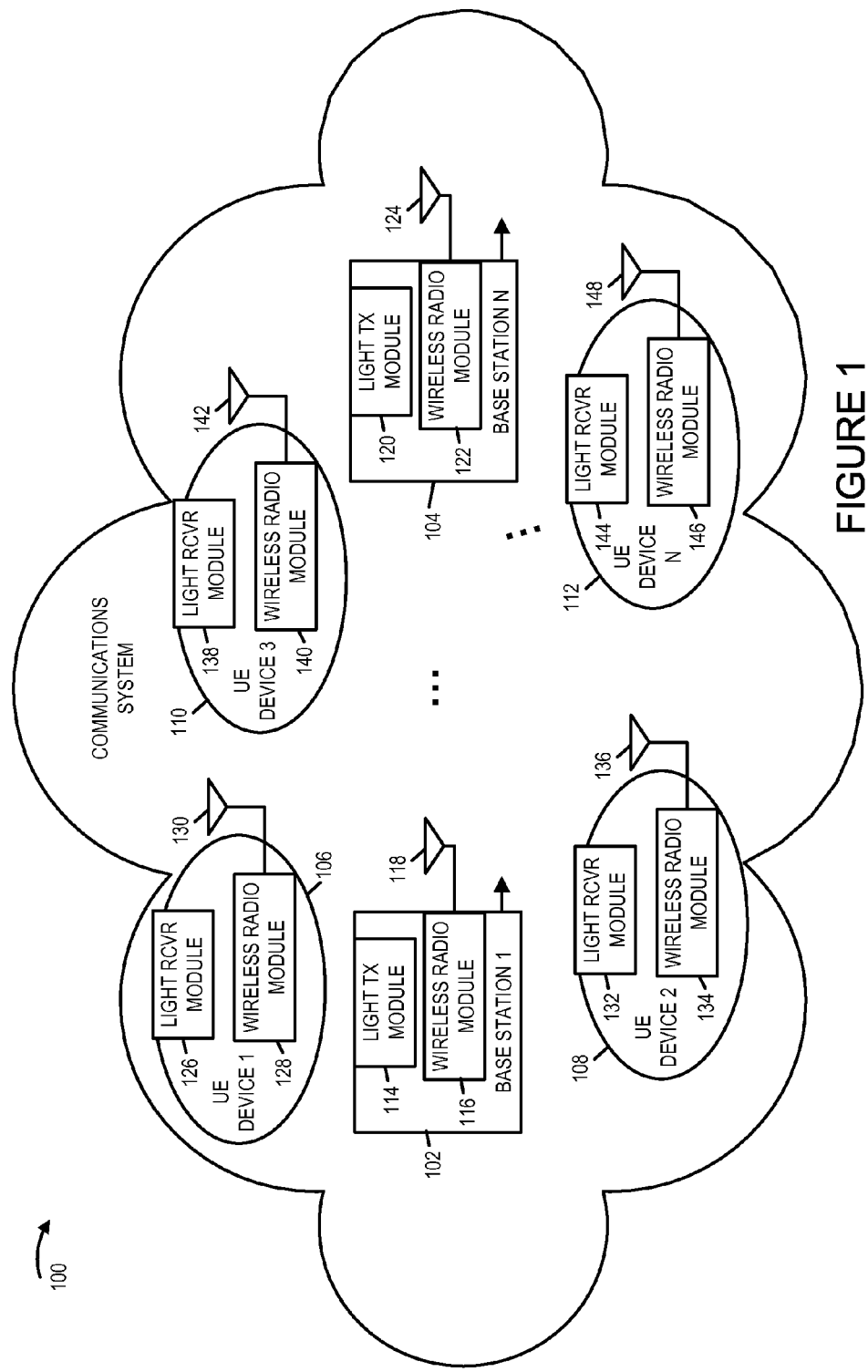
FIG. 1 is a drawing of an exemplary communications system in accordance with various exemplary embodiments.

FIG. 1 is a drawing of an exemplary communications system 100 in accordance with various exemplary embodiments.

Exemplary communications system 100 includes a plurality of base stations (base station 1 102, ..., base station N 104) and a plurality of user equipment (UE) devices (UE device 1 106, UE device 2 108, UE device 3 110, ..., UE device N 112). Each base station includes a light transmitter module and a wireless radio module, while each UE device includes a light receiver module and a wireless radio module. Base station 1 102 includes light transmitter module 114 and wireless radio module 116 coupled to antenna 118. Base station N 104 includes light transmitter module 120 and wireless radio module 122 coupled to antenna 124. Base stations are sometimes referred to as access points (APs.)

In some embodiments, at least one base station has its light transmitter module located at a different location than its wireless radio module. In some such embodiments, the light transmitter module of the base station is located somewhere within the wireless radio coverage area of the wireless radio module of base station; different portions of the base station may be coupled together via a wireline link.

UE device 1 106 includes light receiver module 126 and wireless radio module 128 coupled to antenna 130. UE device 2 108 includes light receiver module 132 and wireless radio module 134 coupled to antenna 136. UE device 3 110 includes light receiver module 138 and wireless radio module 140 coupled to antenna 142. UE device N 112 includes light receiver module 144 and wireless radio module 146 coupled to antenna 148.

The base stations transmit information using both light signals and radio signals. The base stations also receive information using radio signals. The UE devices receive both light signals and radio signals and transmit information using radio signals.

In various embodiments, different base stations support different technologies, support different wireless communications protocols and/or use different wireless communications bands. In some embodiments, information used to identify the wireless communications protocol and/or wireless radio band used by the base station is communicated via a light signal or signals.

In some embodiments, a base station transmits discovery information via light signals and traffic data signals via radio signals. In some embodiments, a base station transmits discovery information and traffic data signals via light signals. In some such embodiments, the data rate of information communicated via light signals varies, e.g., with a higher data rate when transmitting traffic data than when transmitting discovery information.

In some embodiments, light signals from a base station convey information, e.g., discovery information such as an ID, e.g., a Wi-Fi SSID, or an access point Pre-Shared Key (AP PSK), which when detected by a UE device triggers a change in the UE device from a first mode of device operation to a second mode of device operation, wherein the second mode of device operation is a higher power consumption mode of operation. In some embodiments, a light signal, e.g., a light beacon signal from a base station, communicates information. In some such embodiments, a UE device which detects the light signal and recovers the communicated information powers on and/or configures a wireless radio within the UE device or one or more particular wireless radio modules or one or more particular wireless radio circuits within the UE device in response to the recovered communicated information. In some embodiments, a light signal, e.g., a light beacon signal from a base station, communicates information, e.g., an ID or a PSK, which when detected triggers the UE device to change a reverse bias voltage value of a photodiode of the UE device, e.g., from a first predetermined reverse bias voltage value to a second predetermined reverse bias voltage value where the second value is higher than the first value, facilitating the communications of data via light signals at a higher data rate and/or using a larger frequency band. For example, the photodiode of the UE device is set to the first value while in a discovery mode of device operation in which the UE device is searching for an AP and attempting to detect discovery signals, and the photodiode reverse bias voltage is set to the second value for a second mode of device operation in which downlink traffic data may be, and sometimes is communicated to the UE device via light signals. In various embodiments, a light signal, e.g., a light beacon signal from a base station, communicates information, e.g., an ID or a PSK, which when detected triggers the UE device to establish wireless radio communications with the base station. In some embodiments, a particular UE device is responsive to a particular set of IDs and/or PSKs which may be communicated via light signals from a base station. In some such embodiments, different UE devices are responsive to different sets of IDs and/or PSKs which may be communicated via light signals from a base station.

Figure 2:
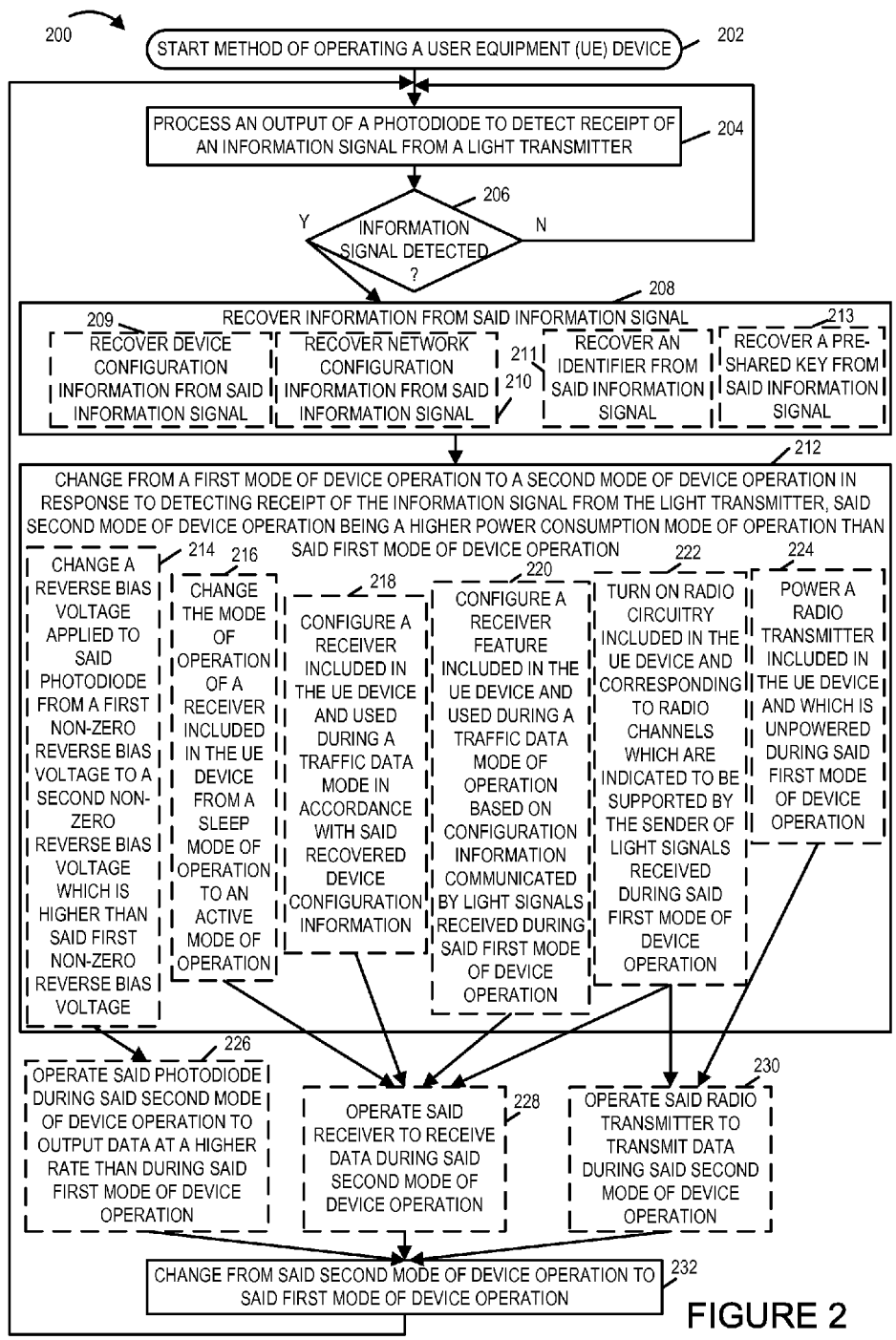
FIG. 2 is a flowchart of an exemplary method of operating a user equipment (UE) device in accordance with various exemplary embodiments.

FIG. 2 is a flowchart 200 of an exemplary method of operating a user equipment (UE) device in accordance with various exemplary embodiments. Operation of the exemplary method starts in step 202 where the UE device is powered on and initialized. Operation proceeds from step 202 to step 204. In step 204, the UE device processes an output of a photodiode to detect receipt of an information signal from a light transmitter. In some embodiments, the information signal communicates a light source ID, an access point (AP) ID, e.g., a Wi-Fi SSID, an access point Pre-Shared Key (PSK) or other information indicating the presence of an access point. In some embodiments, the PSK is time varying. In various embodiments, it is beneficial to communicate an AP's PSK in the information signal from the light transmitter rather than an AP's ID, e.g., an SSID, in order to limit access to a particular set of UE devices. Operation proceeds from step 204 to step 206.

In step 206, if the UE device determines that an information signal was detected in the processing of step 204, then operation proceeds from step 206 to step 208; otherwise, operation proceeds from step 206 to the input of step 204.

Returning to step 208, in step 208 the UE device recovers information from said information signal. In some embodiments, step 208 includes one or more or all of steps 209, 210, 211 and 213. In step 209 the UE device recovers device configuration information from said information signal. The device configuration information includes configuration information pertaining to the UE device and/or an AP. Exemplary device configuration information includes, e.g., communications protocol information, frequency tuning information, timing/frequency structure information, power level information, rate and/or modulation information. In step 210 the UE device recovers network configuration information from the information signal, e.g., information about the network that is sitting behind the AP. In step 211 the UE device recovers an identifier, e.g., an AP ID such as a Wi-Fi SSID, from the information signal. In step 213, the UE device recovers a Pre-Shared Key (PSK) from the information signal. Operation proceeds from step 208 to step 212.

In step 212 the UE device changes from a first mode of device operation to a second mode of device operation in response to detecting receipt of an information signal from a light transmitter, said second mode of device operation being a higher power consumption mode of operation than said first mode of device operation. In some embodiments, the execution of step 212 is contingent upon a recovered AP ID or a recovered PSK from step 208 matching a value, e.g., a value in a predetermined set of values corresponding to a set of APs for which the UE device is allowed access. In various embodiments, the first mode of device operation is a discovery mode of operation and the second mode of device operation is a traffic mode of operation. The discovery mode of operation is, e.g., a mode in which information about communications devices, communications services, device capability and/or configuration information used to enable communications is exchanged. The traffic mode of operation is, e.g. a mode in which user data corresponding to an application, e.g., voice, data or text application is communicated.

In some embodiments, changing from the first mode of device operation to the second mode of device operation is performed in accordance with a communications schedule including discovery intervals in which the first mode of device operation is used and traffic data intervals in which the second mode of device operation is used. In some such embodiments, changing from the first mode of device operation to the second mode of device operation is contingent upon said schedule and receipt of a light signal from an access point which can support the communications of user data during said second mode of device operation. In some such embodiments, the light signal communicates information indicating whether or not the access point can support the communications of user data from an additional UE device. In some embodiments, the light signal communicates information indicating which one or more communications resources and/or capabilities are supported by the access point. In some embodiments, the light signal communicates information indicating which one or more communications resources and/or capabilities are available for the communications of user data with an additional UE device, e.g., downlink via light signaling using a first light signaling frequency band, downlink via light signaling using a second light signaling frequency band, downlink via radio signaling using a first radio frequency band and a first communications protocol, downlink via radio signaling using a second radio frequency band and the first communications protocol, downlink via radio signaling using a third radio frequency band and a second communications protocol, downlink via radio signaling using a fourth radio frequency band and the second communications protocol, uplink via radio signaling using a fifth radio frequency band and a third communications protocol, uplink via radio signaling using a sixth radio frequency band and the third communications protocol, uplink via radio signaling using a seventh radio frequency band and a fourth communications protocol, and/or uplink via radio signaling using an eight radio frequency band and the fourth communications protocol.

In various embodiments, step 212 includes one or more or all of steps 214, 216, 218, 220, 222, and 224. In step 214, the UE device changes a reverse bias voltage applied to said photodiode from a first non-zero reverse bias voltage to a second non-zero reverse bias voltage which is higher than said first non-zero reverse bias voltage. In step 216, the UE device changes the mode of operation of a receiver included in the UE device from a sleep mode of operation to an active mode of operation. In some such embodiments, said receiver is a radio receiver. In some embodiments, the first mode of device operation includes operating in a reduced power visible light communication (VLC) mode of operation and operating in a radio frequency sleep mode of operation. In step 218, the UE device configures a receiver included in the UE device and used during a traffic data mode in accordance with said recovered device configuration information. In some embodiments, configuring a receiver included in the UE device includes configuring decoder settings and/or installing other configuration information. In step 220, the UE device configures a receiver feature included in the UE device and used during a traffic data mode of operation based on configuration information communicated by light signals received during said first mode of operation. In some embodiments, the receiver being configured in step 220 is the receiver including the photodiode. In some embodiments, receiver features include: a wavelength-division multiplexing band selection setting, a bandwidth setting, and a modulation setting. In some embodiments, the configuration information includes information indicating at least one of wavelength-division multiplexing (WDM) bands, bandwidth, or modulation used to communicate data using light signals during said traffic data mode of operation. In step 222, the UE device turns on radio circuitry corresponding to radio channels which are indicated to be supported by the sender of light signals received during said first mode of device operation. In some such embodiments, the radio channels are used by an access point from which the light signals were received during said first mode of device operation, and the radio channels are used to communicate user data between the UE device and the access point from which the light signals were received. In some such embodiments, the received light signals indicate one of a plurality of communications protocols, e.g., WiFi, Bluetooth, etc., to be used to communicate with the access point. In step 224, the UE device powers a radio transmitter included in the UE device and which is unpowered during said first mode of device operation. For example, the UE device powers on a radio transmitter included in the UE device and radio receiver included in the UE device, e.g., a WiFi transmitter/receiver included in the UE device, which was unpowered during the first mode of device operation, based on information communicated in a detected light beacon signal.

If step 214 is performed, operation proceeds from step 214 to step 226. In step 226, the UE device operates said photodiode during said second mode of device operation to receive and output data at a higher rate than during said first mode of device operation. The higher rate output is made possible by the use of the higher reverse bias voltage on the photodiode which increases the bandwidth that is supported by the photodiode as compared to when a lower reverse bias voltage is used. It should be appreciated that during the second mode of device operation, the device transmitting to the UE device may, and in some embodiments does, transmit data at a higher rate than during the first mode of device operation, Thus, for example, where the first mode of device operation is a discovery mode and the second mode of device operation is a traffic data mode, the UE device can receive and recover data at a higher rate during the second mode, e.g., traffic data mode than during the first mode, e.g., discovery mode. In various embodiments, the data output at a higher rate during said second mode of device operation is recovered from the photodiode supporting a larger optical bandwidth during said second mode of device operation than during said first mode of device operation. If one or more or all of steps 216, 218, 220 and 222 are performed, operation proceeds from the one or more of steps 216, 218, 220 and 222 which are performed to step 228. In step 228, the UE device operates said receiver to receive data during said second mode of device operation.

If one or both of steps 222 and 224 are performed, operation proceeds from step 222 and/or step 224 to step 230. In step 230, the UE device operates said radio transmitter to transmit data during said second mode of device operation.

Operation proceeds from steps 226, 228, and 230 to step 232. In step 232, the UE device changes from said second mode of device operation to said first mode of device operation. In various embodiments, changing from the second mode of device operation to said first mode of device operation is performed in accordance with said communications schedule including discovery intervals in which said first mode of device operation is used and traffic intervals during which said second mode of device operation is used. In some embodiments, the UE device remains in the second mode of device operation as long as the UE device has data to communicate to the AP and/or the AP has data to communicate to the UE device. Thus in some embodiments, the UE device changes from the second mode of device operation to the first mode of device operation in response to a determination that the UE and AP no longer have data to communicate to one another. Operation proceeds from step 232 to the input of step 204 to monitor to detect receipt of another information signal from a light transmitter while the UE device is in the first mode of device operation.

Figure 3:
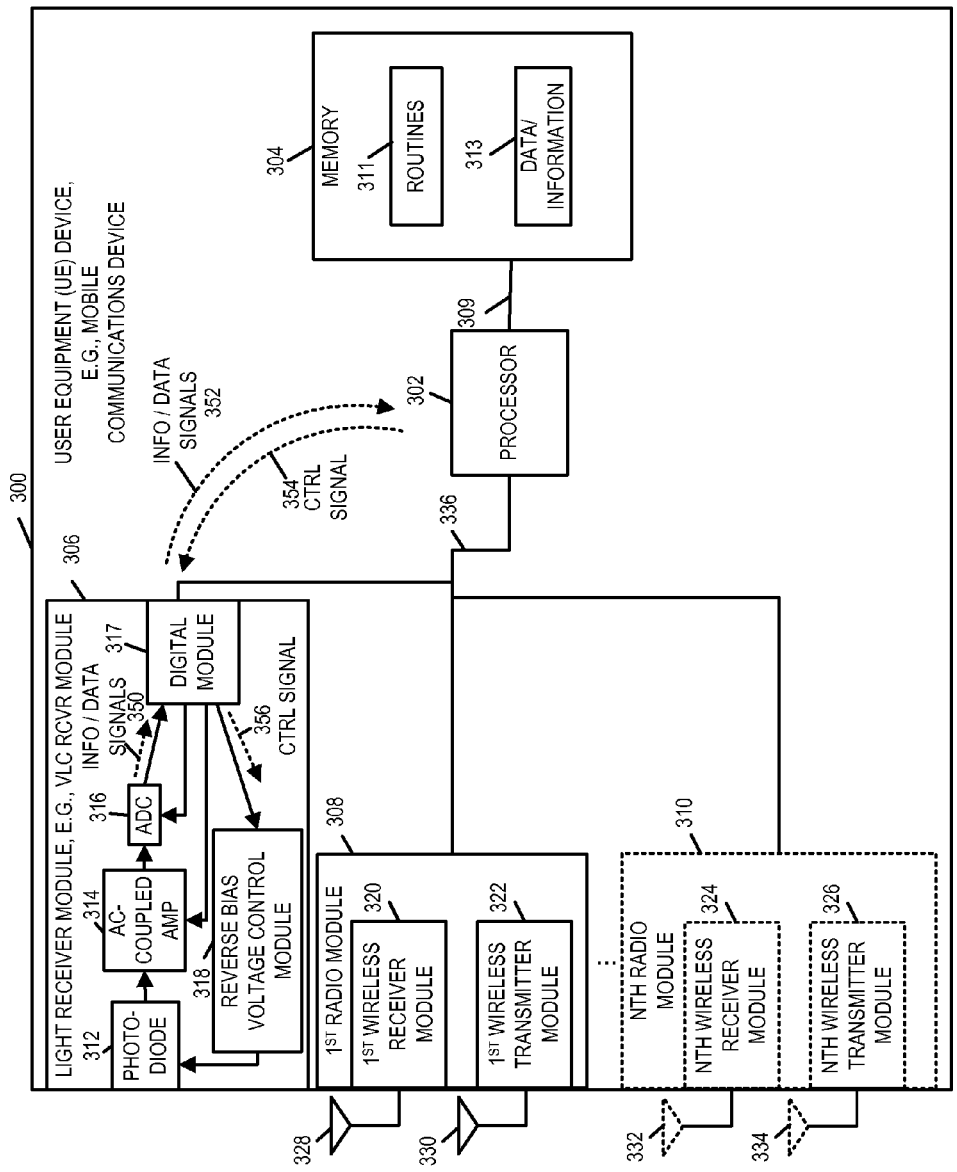
FIG. 3 is a drawing of an exemplary user equipment (UE) device in accordance with an exemplary embodiment.

FIG. 3 is a drawing of an exemplary user equipment (UE) device 300 in accordance with an exemplary embodiment. The UE device 300 is, e.g., one of the wireless UE devices (106, 108, 110, . . . , 112) of system 100 of FIG. 1.

UE device 300 may, and sometimes does, implement a method in accordance with flowchart 200 of FIG. 2. UE device 300 includes a processor 302 and memory 304 coupled together via a bus 309 over which the various elements (302, 304) may interchange data and information. Memory 304 includes routines 311 and data/information 313. UE device 300 further includes a light receiver module 306, e.g., a VLC receiver module, and one or more radio modules ($1^{st}$ radio module 308, . . . , Nth radio module 310). The light receiver module 306 and radio modules (308, . . . , 310) are coupled to processor 302 via bus 336. In various embodiments, one or more or all of light receiver module 306, and radio modules (308, . . . , 310) include configurable features and are configurable, e.g., under the control of processor 302. Different configurable features include, e.g., configurable band selection, configurable bandwidth, configurable modulation scheme, configurable modulation constellation, configurable data rate, configurable coding type, configurable coding rate, configurable communications protocol, configurable power level, configurable filters, configurable symbol timing, configurable tone width, configurable timing structure, configurable channels, etc. Light receiver module 306 includes a photodiode 312, an AC-coupled amplifier 314, and an analog to digital converter (ADC) 316, a digital module 317 and a reverse bias voltage control module 318. Light signals detected by photodiode 312 are amplified by amplifier 314, and the amplified analog signal is processed by ADC 316 resulting in a digital signal 350 communicating information and/or data which is received and processed by digital module 317. Digital module 317 transmits information/data signal 352 to processor 302 communicating information and/or data included in signal 350. Processor 302 generates and transmits control signal 354 to digital module 317 in response to information included in and/or communicated by a received signal 352. The digital module 317, under the direction of processor 302 generates and sends a control signal 356 to reverse bias voltage control module 318 to set and/or change the reverse bias voltage applied to the photodiode. Other control signals, e.g., control signals including configuration information, may be, and in some embodiments are, generated and transmitted to one or more or all of: light receiver module 306, first radio module 308, . . . , Nth radio module 310.

In some embodiments, during a first mode of device operation, e.g., a discovery mode of operation, signals 350 and 352 convey discovery information, e.g., an access point identifier, an access point pre-shared key, device configuration, and/or network configuration information. In some such embodiments, during a second mode of device operation, e.g., a traffic data mode of operation, signals 350 and 352 convey downlink traffic data signals from an access point.

In some embodiments, the reverse bias voltage of the photodiode 312 is controlled to be at different levels as a function of the mode of operation, e.g., a low level corresponding to a discovery mode of operation and a higher level corresponding to a traffic data mode of operation. In some embodiments, a light signal received during a discovery mode of operation, e.g., a light beacon signal, communicates light source ID information, access point ID information, e.g., base station ID information, e.g., a Wi-Fi SSID, an AP PSK, communications resource information, communication capability information, communications attributes' information, UE light receiver configuration information, UE radio receiver configuration information, UE radio transmitter configuration information, a UE radio receiver or radio receiver circuitry activation information and/or a UE radio transmitter or radio transmitter circuitry activation information. In various embodiments, received light signals communicated during the traffic data mode of operation communicate user traffic signals, e.g., traffic data corresponding to a voice, text, file, image, or application.

First radio module 308 includes a first wireless receiver module 320 coupled to receive antenna 328, via which UE device 300 receives radio signals. The radio signals include traffic data signals, e.g., downlink traffic data signals from the same access point which transmitted a detected light signal. First radio module 308 includes a first wireless transmitter module 322 coupled to transmit antenna 330, via which UE device 300 transmits radio signals. The radio signals include traffic data signals, e.g., uplink traffic data signals to the same access point which transmitted a detected light signal.

Nth radio module 310 includes Nth wireless receiver module 324 coupled to receive antenna 332, via which UE device 300 receives radio signals. The radio signals include traffic data signals, e.g., downlink traffic data signals from the same access point which transmitted a detected light signal. Nth radio module 310 includes Nth wireless transmitter module 326 coupled to transmit antenna 334, via which UE device 300 transmits radio signals. The radio signals include traffic data signals, e.g., uplink traffic data signals to the same access point which transmitted a detected light signal.

In some embodiments, the different radio modules correspond to different communications technologies, different communications protocols and/or different frequency bands. For example, one radio module may correspond to WiFi, another radio module may correspond to LTE, and still another radio module may correspond to CDMA. In some embodiments, different access points, e.g., different base stations support different technologies, different communications protocols and/or different frequency bands. In some embodiments, UE device 300 may, and sometimes does, simultaneously communicate with one base station, e.g., a WiFi AP, via radio module 308 and with another base station, e.g., an LTE base station, via radio module 310. One or more of the radio modules may be activated and/or used, e.g., in response to a light signal, e.g., a light beacon signal detected from an access point. In some embodiments, a individual radio module includes a plurality of sets of circuitry corresponding to different technologies, protocols and/or frequency bands, and one or more sets of circuitry with a particular radio module may be, and sometimes are, activated in response to a detected light signal, e.g., a light beacon signal, from an access point. In various embodiments, one or more radio receivers (320, . . . , 324) are used to supplement downlink communications from an access point during a data traffic interval in addition to traffic data being communicated to light receiver module 306.

In some embodiments, one or more of modules 306, 308, and 310 are included in processor 302. In some embodiments, one or more of portions of one or more of modules 306, 308, and 310 are included in processor 302.

In various embodiments, processor 302 is configured to: process an output of a photodiode to detect receipt of an information signal from a light transmitter; and change from a first mode of device operation to a second mode of device operation in response to detecting receipt of an information signal from a light transmitter, said second mode of device operation being a higher power consumption mode of operation than said first mode of device operation. In some embodiments, the information signal communicates a light source ID, access point ID or other information indicating the presence of an access point. In some embodiments, VLC module 306 operates in conjunction with processor 302. In various embodiments, VLC module 306 operates under the control of processor 302. In some such embodiments, processor 302 is configured to control VLC module 306 to process an output of an photodiode to detect receipt of an information signal from a light transmitter and change from a first mode of device operation to a second mode of device operation in response to detecting receipt of an information signal from a light transmitter. In some embodiments, digital module 317 of VLC module 306 forwards digital information signals to processor 302, processor 302 processes the information signal to detect receipt of an information signal from a light transmitter, e.g., identifies a particular ID, and processor 302 changes the mode of device operation from a first mode of device operation to a second mode of device operation in response to detecting receipt of an information signal from a light source. In some such embodiments, processor 302 sends a control signal to reverse bias voltage control module 319 via digital module 317.

In some embodiments, processor 302 is further configured to change a reverse bias voltage applied to said photodiode from a first non-zero reverse bias voltage to a second non-zero reverse bias voltage which is higher than said first non-zero reverse bias, as part of being configured to change from said first mode of device operation to said second mode of device operation. In some such embodiments, processor 302 is further configured to further operate the photodiode during said second mode of device operation to output data at a higher data rate than during said first mode of device operation. In some such embodiments, said data output at a higher rate during said second mode of device operation is recovered from said photodiode supporting a larger optical bandwidth during said second mode of device operation than during said first mode of device operation.

In various embodiments, processor 302 is configured to change a reverse bias voltage applied to the photodiode via sending a control instruction to reverse bias control module 318.

In some embodiments, processor 302 is configured to change the mode of operation of a receiver (e.g., first wireless receiver module 320) from a sleep mode of operation to an active mode of operation, as part of being configured to change from said first mode of device operation to said second mode of device operation. In some such embodiments, said receiver is a radio receiver.

In various embodiments, processor 302 is configured to operate the UE device during some time intervals in a first mode of device operation. In some such embodiments, processor 302 is configured to operate in a reduced power VLC (visible light communication) mode of operation and operate in a radio frequency sleep mode of operation, as part of being configured to operate in a first mode of device operation.

In some embodiments, the first mode of device operation is a discovery mode of operation, e.g., a mode in which information about communications devices, communications services, device capability and/or configuration information used to enable communication is communicated and said second mode of device operation is a traffic mode of operation, e.g., a mode in which user data corresponding to an application, e.g., voice, data or text application is communicated. In some embodiments, when UE device 300 is in the discovery mode of operation, UE device 300 monitors for light signals from an AP communicating information. In some embodiments, during the discovery mode of operation, the UE device does not transmit any signals. In some other embodiments, during a discovery mode of operation, UE device 300 may, and sometimes does, transmit, e.g., broadcast, radio signals communicating information during a discovery mode of operation.

In some embodiments, processor 302 is configured to power a radio transmitter (e.g., first wireless transmitter module 322) which is unpowered during said first mode of device operation, as part of being configured to change from a first mode of device operation to said second mode of device operation. For example, in one embodiment, processor 302 powers on a WiFi transmitter/receiver when processor 302 detects a light beacon, e.g., a light beacon from a base station communicating that WiFi is supported by the base station for traffic data communications.

In various embodiments, processor 302 is configured to: recover device configuration information from said information signal; and processor 302 is configured to configure a receiver (e.g., first wireless receiver module 320) used during said traffic data mode of operation in accordance with said recovered device configuration information, as part of being configured to changing from said first mode of device operation to said second mode of device operation. For example, configuring a receiver in some embodiments includes configuring decoder setting and/or installing other configuration information in the receiver.

In some embodiments, processor 302 is configured to configure a receiver feature (e.g., a feature of light receiver module 306) used during said traffic data mode of operation based on configuration information communicated by light signals received during said first mode of device operation, as part of being configured to change from said first mode of device operation to said second mode of device operation. In some such embodiments, the configuration information includes information indicating at least one of WDM bands, bandwidth, or modulation to be used by the receiver to communicate data using light signals during said traffic data mode of operation. In some such embodiments, receiver features include: a wavelength-division multiplexing band selection setting, a bandwidth setting, and a modulation setting.

In various embodiments, processor 302 is configured to turn on radio circuitry (e.g., first wireless receiver module 320 and/or first wireless transmitter module 322) corresponding to radio channels which are indicated to be supported by the sender of light signals received during said first mode of device operation, as part of being configured to change from said first mode of device operation to said second mode of device operation. In some such embodiments, said radio channels are used by an access point from which light signals were received during said first mode of device operation, said radio channels being used to communicate user data between said UE device and the access point from which the light signals were received. In some such embodiments, the received light signals indicate one of plurality of communications protocols, e.g., WiFi, Bluetooth, etc., to be used to communicate with said access point.

Processor 302, in some embodiments, is configured to perform the changing from said first mode of device operation to said second mode of device operation in accordance with a communications schedule including discovery intervals in which said first mode of device operation is used and traffic data intervals during which said second mode of device operation is used, as part of being configured to change from said first mode of device operation to said second mode of device operation. In some embodiments, processor 302 is configured to perform the change from said first mode of device operation to said second mode of device operation contingent upon said schedule and the receipt of a light signal from an access point which can support the communication of user data during said second mode of device operation.

In various embodiments, processor 302 is configured to change from said second mode of device operation to said first mode of device operation in accordance with said communications schedule including discovery intervals in which said first mode of device operation is used and traffic data intervals during which said second mode of device operation is used.

In some embodiments, processor 302 is configured to change from said second mode of device operation to said first mode of device operation in response to a determination that the UE device 300 does not have any additional data, e.g., uplink traffic data, to transmit to the AP and the AP does not have any additional data, e.g., downlink traffic data, to transmit to the UE device.

Figure 4A:
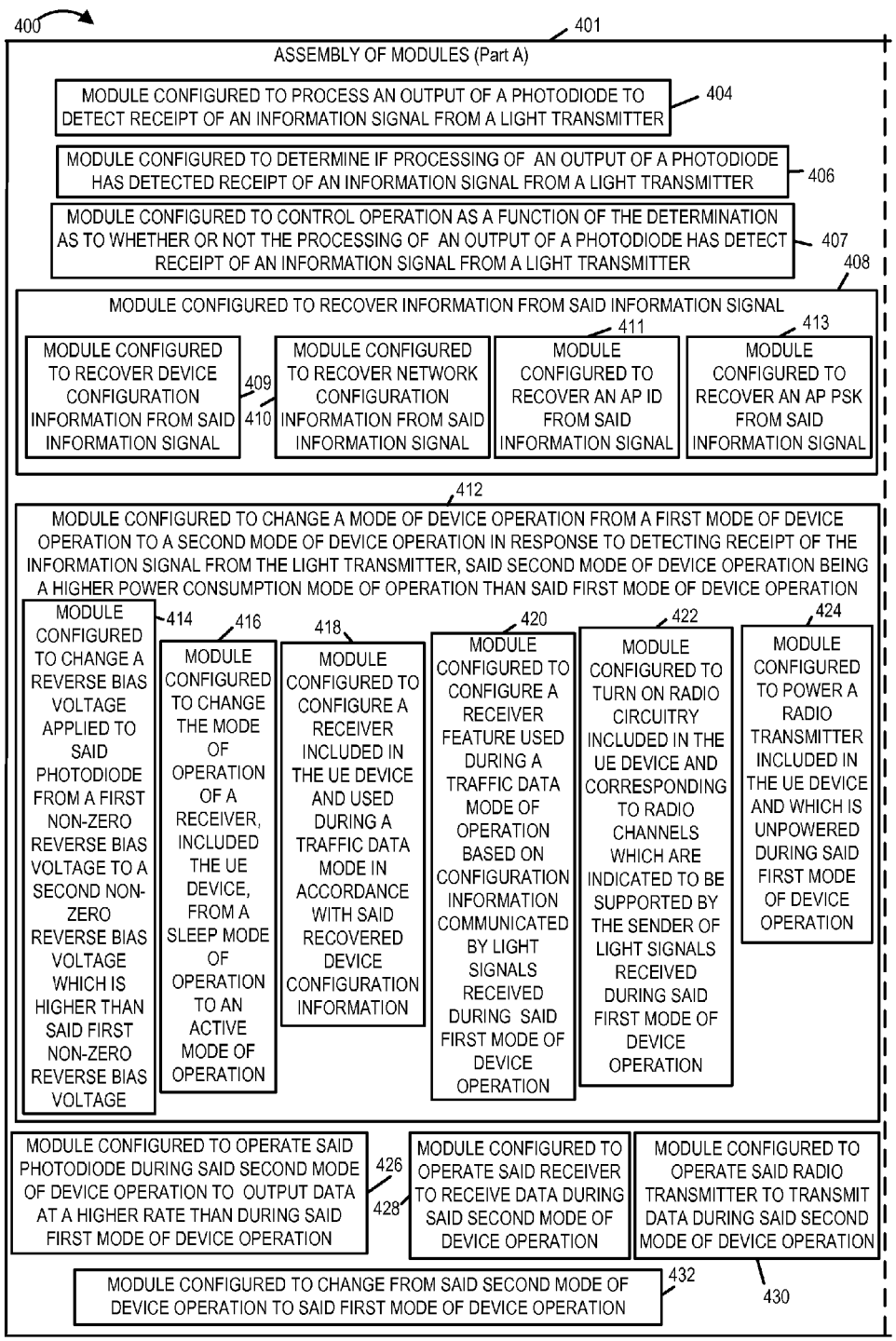
FIG. 4A is a first portion of an assembly of modules which can, and in some embodiments is, used in the UE device illustrated in FIG. 3.
Figures 4, 4B:
FIG. 4B is a second portion of an assembly of modules which can, and in some embodiments is, used in the UE device illustrated in FIG. 3.

FIG. 4 is an assembly of modules 400 which can, and in some embodiments is, used in the UE device 300 illustrated in FIG. 3. The modules in the assembly 400 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. As should be appreciated the level of integration of modules on the processor and or with some modules being external to the processor may be one of design choice. Alternatively, rather than being implemented as circuits, all or some of the modules may be implemented in software and stored in the memory 304 of UE device 300 shown in FIG. 3 with the modules controlling operation of the UE device 300 to implement the functions corresponding to the modules when the modules are executed by a processor, e.g., processor 302. In still other embodiments, various modules are implemented as a combination of hardware and software, e.g., with a circuit external to the processor 302 providing input to the processor 302 which then under software control operates to perform a portion of a module's function.

While shown in the FIG. 3 embodiment as a single processor 302, e.g., computer, within device 300, it should be appreciated that processor 302 may be implemented as one or more processors, e.g., computers. When implemented in software, the modules include code, which when executed by the processor, configure the processor, e.g., computer, to implement the function corresponding to the module. In some embodiments, processor 302 is configured to implement each of the modules of the assembly of modules 400. In embodiments where the assembly of modules 400 is stored in memory 304, and the memory 304 is a computer program product, the computer program product comprises a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the device 300 or elements therein such as the processor 302 to perform the functions of the corresponding steps illustrated and/or described in the method of flowchart 200 of FIG. 2.

FIG. 4, comprising the combination of FIG. 4A and FIG. 4B, is an exemplary assembly of modules 400, including part A 401 and Part B 403, in accordance with various embodiments. Assembly of modules 400 includes a module 404 configured to process an output of a photodiode to detect receipt of an information signal from a light transmitter, a module 406 configured to determining if processing of an output of a photodiode has detected receipt of an information signal from a light transmitter, a module 407 configured to control operation as a function of the determination as to whether or not the processing of an output of a photodiode has detected receipt of an information signal from a light transmitter, e.g., control module 408 to execute in response to a determination that the processing of an output of a photodiode has detected receipt of an information signal from a light transmitter, a module 408 configured to recover information from said information signal and a module 412 configured to change a mode of device operation from a first mode of device operation to second mode of device operation in response to detecting receipt of an information signal from a light transmitter, said second mode of device operation being a higher power consumption mode of operation than said first mode of device operation. In some embodiments, module 408 is attempting to recover information including one of more or all of an identifier, e.g., an access point identifier such as, e.g., a Wi-Fi SSID, an AP PSK, device configuration information, or network configuration information. Module 408 includes a module 409 configured to recover device configuration information from said information signal, a module 410 configured to recover network configuration information from said information signal, a module 411 configured to recover an access point identifier from said information signal, and a module 413 configured to recover a pre-shared key (PSK) from said information signal. Module 412 includes a module 414 configured to change a reverse bias voltage applied to said photodiode from a first non-zero reverse bias voltage to a second non-zero reverse bias voltage which is higher than said first non-zero reverse bias voltage, a module 416 configured to change the mode of operation of a receiver included in the UE device from a sleep mode of operation to an active mode of operation, a module 418 configured to configure a receiver included in the UE device and used during a traffic data mode in accordance with said recovered device configuration information, a module 420 configured to configure a receiver feature included in the UE device and used during a traffic data mode of operation based on configuration information communicated by light signal received during said first mode of device operation, a module 422 configured to turn-on radio circuitry included in the UE device (e.g., included in first radio module 308) and corresponding to radio channels which are indicated to be supported by the sender of light signals received during said first mode of device operation and a module 424 configured to power a radio transmitter included in the UE and which is unpowered during said first mode of device operation.

Assembly of modules 400 further includes a module 426 configured to operate said photodiode during said second mode of device operation to output data at a higher rate than during said first mode of device operation, a module 428 configured to operate said receiver to receive data during said second mode of device operation, a module 430 configured to operate said radio transmitter to transmit data during said second mode of device operation, and a module 432 configured to change from a second mode of device operation to said first mode of device operation.

In some embodiments, the information signal detected by module 404 communicates a light source ID, access point ID, or other information indicating the presence of an access point. In some embodiments, the signal detected by module 404 is a light beacon. In various embodiments, data output at a higher rate during the second mode of device operation is recovered from the photodiode supporting a larger optical bandwidth during the second mode of device operation than during the first mode of device operation. In some embodiments, the receiver configured to change from a sleep mode of operation to an active mode of operation by module 416 is a radio receiver. In some embodiments, the first mode of device operation includes operating in a reduced power visible light communication (VLC) mode of operation and operating in a radio frequency sleep mode of operation. In various embodiments, the first mode of device operation is a discovery mode of operation, e.g., a mode in which information about communications devices, communications services, device capability, and/or configuration information used to enable communications is exchanged, and the second mode of device operation is a traffic mode of operation, e.g., a mode in which user data corresponding to an application, e.g., voice, data, text, or image application is communicated. In some embodiments, module 424 powers on a radio transmitter corresponding to a particular technology and/or using a particular protocol, e.g., a WiFi transmitter. In some embodiments, module 424 powers on a radio transmitter that supports multiple alternative technologies, e.g., WiFi and CDMA, and can be configured to a particular technology and/or protocol of interest, e.g., the technology and/or protocol being used by the access point which transmitted the light signal, e.g., a beacon light signal which was detected.

In some embodiments, the receiver being configured by module 420 is a light signal receiver including the photodiode and the configuration information includes information indicating at least one of WDM bands, bandwidth, or modulation used to communicate data using light signals during a traffic data mode of operation.

In some embodiments, the radio channels corresponding to radio circuitry turned on by module 422 are used by an access point from which light signals were received during the first mode of device operation, and the radio channels are used to communicate user data between UE devices and the access point from which the light signals were received. In some such embodiments, the received light signals, e.g., detected by module 404, indicate one of a plurality of communications protocols, e.g., WiFi, Bluetooth, etc., to be used to communicate with the access point.

In some embodiments, module 412 performs the change from the first mode of device operation to the second mode of device operation in accordance with a communications schedule including discovery intervals in which the first mode of device operation is used and traffic data intervals during which the second mode of device operation is used. In some such embodiments, module 412 performs the change contingent upon said schedule and the receipt of a light signal from an access point which can support the communications of user data during the second mode of device operation. In some embodiments, module 432 performs the change from the second mode of device operation to the first mode of device operation in accordance with said communications schedule including discovery intervals in which the first mode of device operation is used and traffic data intervals during which the second mode of device operation is used.

In various embodiments, assembly of modules 400 includes one or more or all of: a module 450 configured to operate the UE in a reduced power visible light communication (VLC) mode of operation during the first mode of device operation, a module 452 configured to operate the UE in a radio frequency sleep mode of operation during the first mode of device operation, a module 454 configured to control changing from the first mode of device operation to the second mode of device operation in accordance with a communications schedule including discovery intervals in which said first mode of device operation is used and traffic data intervals during which said second mode of device operation is used, a module 456 configured to determined if the UE has detected receipt of a light signal from an access point during the first mode of device operation indicating that the access point can support the communication of user data during the second mode of device operation and that the current time in relation to the schedule supports operation in the second mode of device operation, a module 458 configured to control changing from the second mode of device operation to the first mode of device operation in accordance with a communications schedule including discovery intervals in which said first mode of device operation is used and traffic data intervals during which said second mode of device operation is used, a module 459 configured to control changing from the second mode of device operation to the first mode of device operation in response to a determination that the UE device does not have additional data, e.g., additional uplink traffic data, to communicate to the AP and that the AP does not have additional data, e.g., addition downlink traffic data, to communicate to the UE device. In some embodiments, assembly of modules 400 includes one or more or all of: a module 460 configured to determine a set of configuration information for a receiver including said photodiode based on ID information communicated in a received light signal and stored configuration information corresponding to a plurality of alternative IDs, a module 462 to determine a set of configuration information for a radio receiver based on ID information communicated in a received light signal and stored configuration information corresponding to a plurality of alternative IDs, a module 464 to determine a set of configuration information for a radio transmitter based on ID information communicated in a received light signal and stored configuration information corresponding to a plurality of alternative IDs, and a module 466 configured to recover output data from said photodiode during said second mode of device operation.

In some exemplary embodiments, the means for converting visible light signals into electrical signals is a photodiode, e.g., photodiode 312. In various embodiments, one or more or all of the modules in assembly of modules 400 correspond to means for performing an operation. For example, module 406 of assembly of modules 400 corresponds to means for processing an output of said means for converting visible light signals into electrical signals to detect receipt of an information signal from a light transmitter; and module 412 of assembly of modules 400 corresponds to means for changing from a first mode of device operation to a second mode of device operation in response to detecting receipt of the information signal from the light transmitter, said second mode of device operation being a higher power consumption mode of operation than said first mode of device operation.

Various aspects and or features or some, but not necessarily all, embodiments are further discussed below. Various embodiments are directed to methods and apparatus using Visible light communication (VLC). Some exemplary embodiments facilitate high data rate wireless communications in a power efficient manner. Various described methods and apparatus are well suited for indoor wireless access. In addition to high data rates, VLC communication is particularly attractive because it allows for very power-efficient receivers. In various embodiments, a UE is implemented to discover, via VLC, devices and/or services without significantly impacting its battery life.

Figure 5:
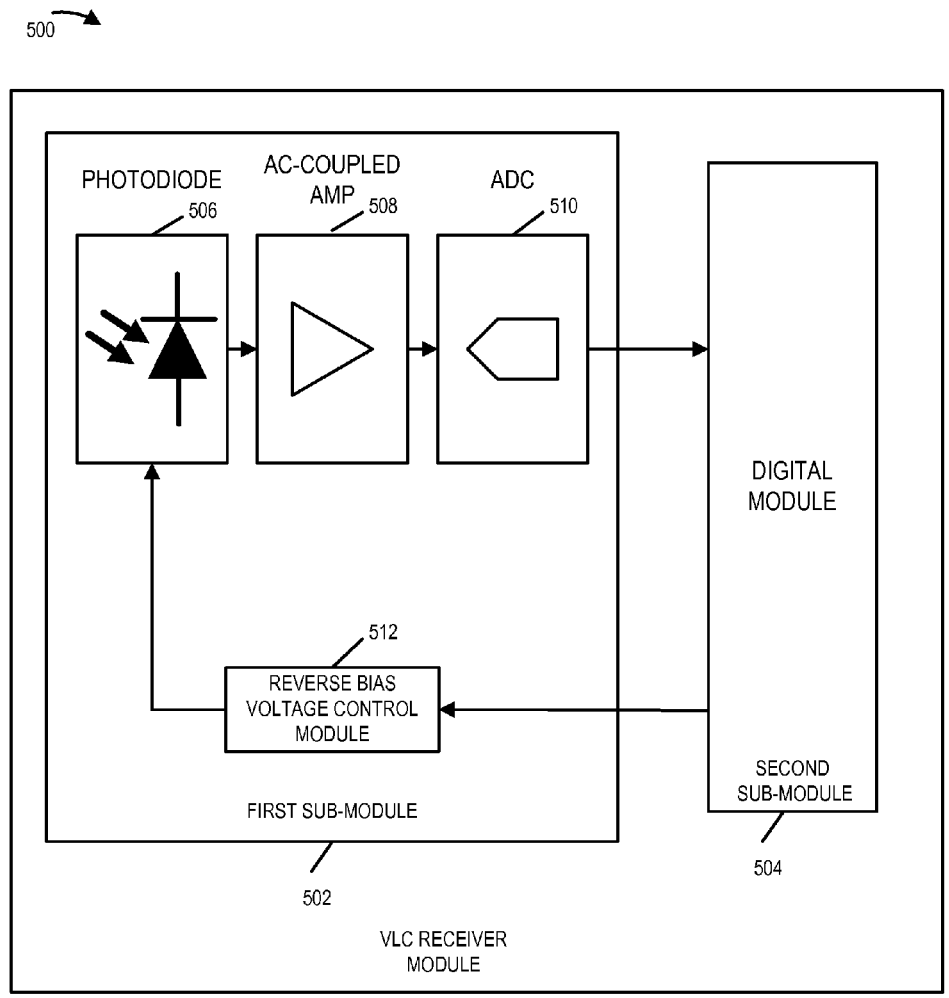
FIG. 5 is a drawing of an exemplary VLC module in accordance with some embodiments.

FIG. 5 is a drawing of an exemplary VLC module 500, e.g., a VLC receiver, in accordance with some embodiments. Exemplary VLC receiver module 500 includes a first sub-module 502 and a second sub-module 504, e.g., a digital module including digital circuitry. First sub-module 502 includes a photodiode 506 coupled to an AC-coupled amplifier 508 coupled to an analog to digital converter (ADC) 510. Photodiode 506 receives VLC signals. The photodiode 506 is, e.g., of PN type or PiN type. First sub-module 502 also includes a reverse bias voltage control module 512, which is used for controlling, e.g., setting and/or changing, the reverse bias value applied to the photodiode 506. In various embodiments, the reverse bias voltage is varied, e.g., between two levels corresponding to different modes of operation, e.g., a first level corresponding to a discovery mode of operation and a second level corresponding to a traffic mode of operation. In some embodiments, the reverse bias voltage during the discovery mode of operation is less than or equal to 1 V and the reverse bias voltage during the traffic mode of operation is greater than or equal to 4V.

In typical communication applications, a photodiode is reverse-biased with a voltage that could range from 5V to 20V, depending on the internal structure of the photodiode and bandwidth requirements. Typical currents drawn corresponding to typical voltages, e.g., 5v to 20v, range from 1 mA to 20 mA and the product of the current and voltage determines the power consumption of the photodiode.

In accordance with some embodiments of the present invention, the reverse bias voltage applied to the photodiode 506 during one mode of operation, e.g., a discovery mode of operation, is much lower than is normally used. This results in a low power consumption mode of operation with regard to the VLC receiver. In some embodiments, the reverse bias voltage is less than 1v. In some such embodiments, the reverse bias voltage is less than 0.2 volts.

Figure 6:
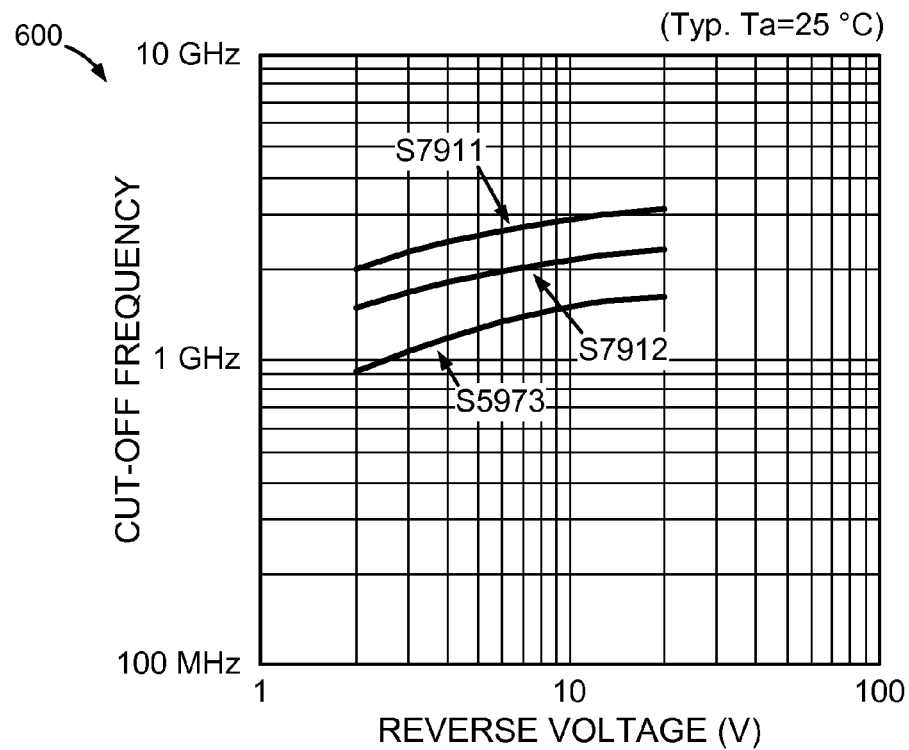
FIG. 6 is a plot illustrating bandwidth as a function of reverse bias in a PiN diode for several exemplary PiN photodiodes.
Figure 7:
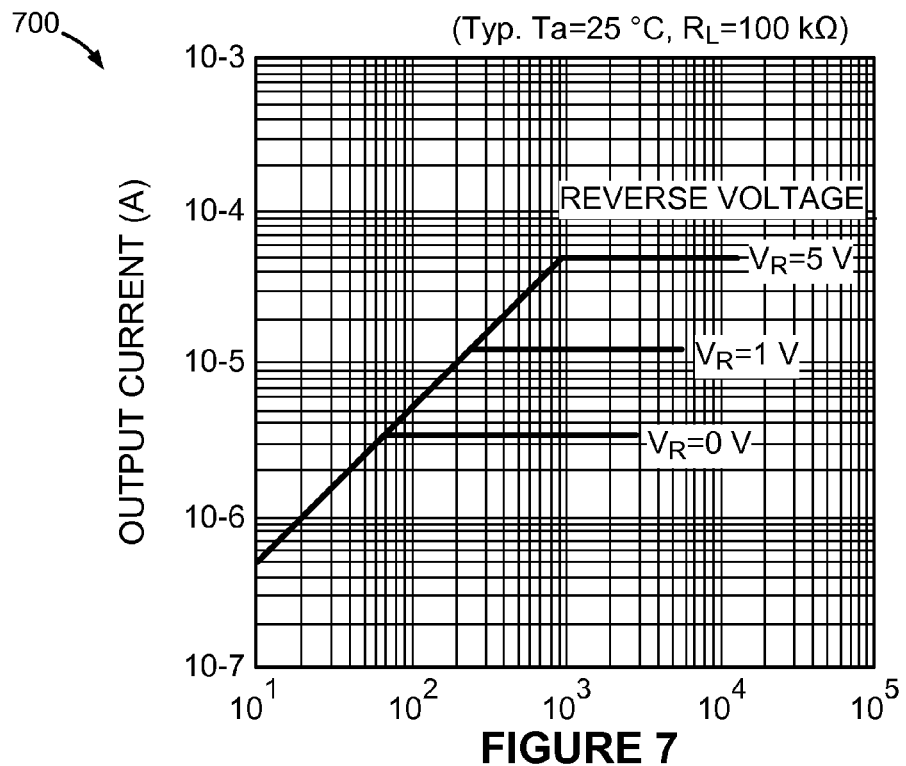
FIG. 7 is a plot illustrates dynamic range as a function of reverse bias in an exemplary Pin photodiode.

The benefit of using a higher reverse bias voltage across a PiN photodiode is two fold.
1) The bandwidth of the photodiode increases. This is because the carrier speed increases with increasing reverse bias voltage, wherein a carrier is an electron-hole pair created by an absorbed photon. See FIG. 6. Drawing 600 of FIG. 6 illustrates bandwidth as a function of reverse bias in a PiN diode for several exemplary PiN photodiodes. The vertical axis represents cut-off frequency while the horizontal axis represents reverse voltage.
2) The dynamic range of the photodiode increases. See FIG. 7. Drawing 700 of FIG. 7 illustrates dynamic range as a function of reverse bias in a Pin photodiode. The vertical axis represents output current in Amps, while the horizontal axis represents illuminance. Three characteristic curves are shown corresponding to reverse bias $V_R$=5v, $V_R$=1v and $V_R$=0V for an exemplary photodiode.

Figure 8:
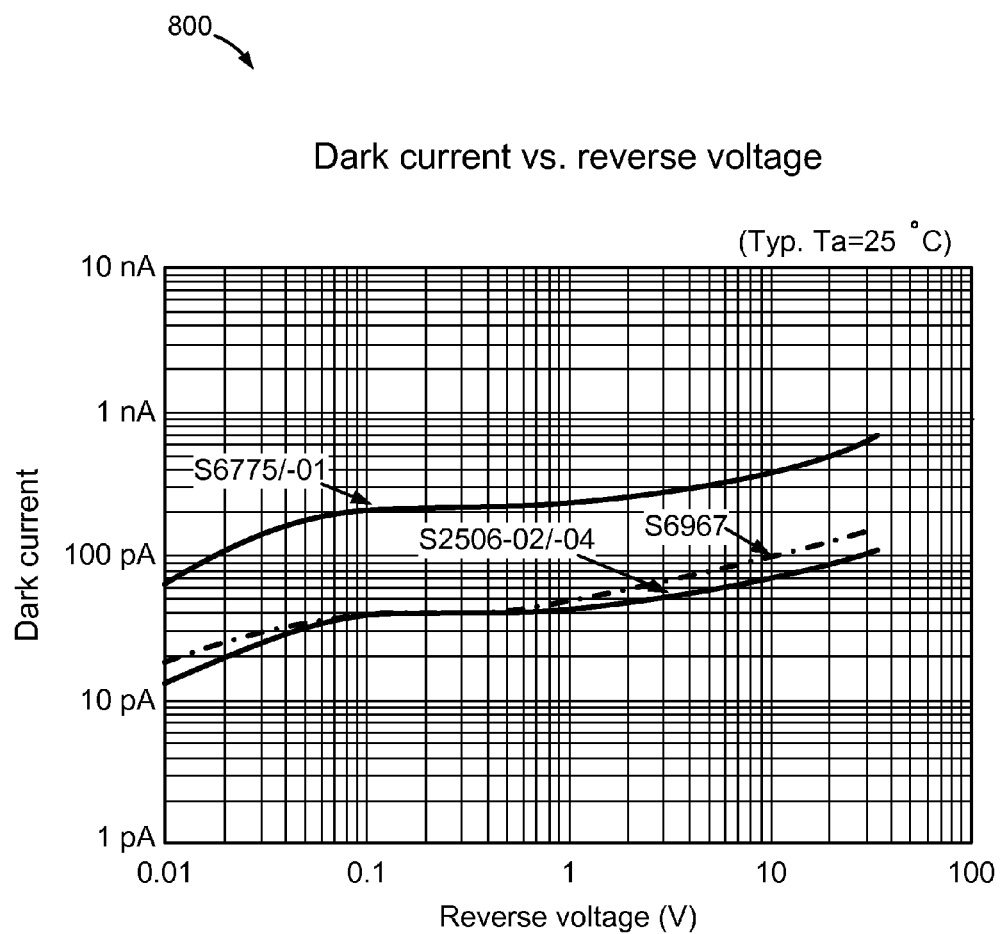
FIG. 8 is a plot illustrating dark current vs. reverse bias voltage for several exemplary photodiodes.

However, there is a downside to using higher reverse voltage and that is that the sensitivity decreases. This is because there are more thermally generated carriers (due to collisions) inside the depletion region, increasing the photodiode's "dark current". See FIG. 8 which plots dark current v. reverse voltage for several exemplary photodiodes. In drawing 800 of FIG. 8 it may be observed that the dark current increases as the reverse voltage increases in a PiN diode.

Thus, a low reverse bias photodiode voltage is well suited for a discovery mode of operation, where sensitivity is important and relatively small amounts of data are to be communicated, and a higher reverse bias voltage is well suited for a traffic data mode of operation where large bandwidth and large dynamic range are important to communicate large amounts of data.

In accordance with various embodiments of the present invention, different reverse bias voltages are used by a user equipment (UE) device, e.g., mobile wireless terminal, at different times. For example, during a service discovery or other discovery mode of operation, a low reverse bias is used for the photodiode in the UE device. Following discovery and possible configuration of a receiver or other circuitry in the user device, the reverse bias on the photodiode is increased providing increased dynamic range and bandwidth that is used for receiving user data and/or other information.

By switching between a low reverse bias voltage mode of operation and a higher reverse bias voltage mode of operation, power can be conserved as compared to systems which use the same reverse bias voltage for all modes of operation without sacrificing the data rate and/or bandwidth that can be used for communication of data during non-discovery and/or other communications modes of operation.

One exemplary embodiment will now be described. A UE applies a nominal, low reverse bias voltage to the photodiode in its VLC receiver. This is the low-power stand-by mode operation of the UE. The level of the reverse bias may be as low as 0.1V, depending on the required sensitivity level and bandwidth of the photodiode. A voltage bias still needs to be applied to the rest of the VLC receiver circuitry, like the amplifier, baseband, and digital components. The UE's VLC receiver detects and decodes a signal transmitted by a transmitter VLC device, e.g., an access point including a VLC transmitter, using the low-biased photodiode. The transmitter device may be an infrastructure access point (AP) which broadcasts a service discovery signal that advertises the details about the services it offers. For example, this signal may give details about the configuration of high-data rate VLC signals, e.g., which WDM bands, bandwidths, and/or modulation it uses, as well as information about which other radio services it supports, e.g., Wi-Fi, 60 GHz, Infrared (IR), Long Term Evolution (LTE), in the case of a Home eNode B (HeNB).

The UE triggers a receiver operation or set of operations in response to the detected decoded VLC signal. This operation or set of operations, in some embodiments, includes increasing the reverse bias of the photodiode from the nominal low-bias to a higher bias that is more appropriate for high-speed traffic data reception since it results in a higher bandwidth. The triggered operation or set of operations, in some embodiments includes the turning on of an auxiliary radio receiver, corresponding to advertised radio service information which was previously transmitted via the service discovery signal.

The UE decodes traffic data signals transmitted using the specified configuration communicated via a service discovery signal. The traffic data signals are communicated using VLC signals and/or auxiliary radio signals using one of the radios advertised in the service discovery signal.

In some embodiments, after the service discovery, if the UE increased its photodiode reverse bias, the UE begins an N second countdown. If the N second countdown period expires before another VLC discovery signal is decoded, e.g., another VLC discovery signal describing the same or a different service from the one previously communicated, the UE restores the photodiode bias to its nominal level. In some such embodiments, the UE device has lost contact with an access point which is capable of supporting traffic data communications with the UE.

In some embodiments, during a discovery time period, after detection of a discovery signal communicating a first service, the UE device increases its reverse bias voltage and starts an M second countdown. The UE continues to monitor for additional discovery signals communicating other available services. If no other services are detected, and the countdown expires, then the UE switches back to the low reverse bias value for the remainder of the discovery interval. During the traffic interval, the UE device operates at the high reverse bias value for its photodiode, if the UE device is using its VLC receiver to receive traffic data.

One of the reasons this mechanism should perform well in the case that the VLC transmitter is a lighting infrastructure device is because the transmission power from an infrastructure element is often high which increases the likelihood of a high SNR at the receiver in the UE and allows for sufficient data to be sent using only a narrowband signal. Moreover, low reverse bias increases the sensitivity of the photodiode, further increasing the SNR and the data rate that can be achieved. Thus, VLC communications is well suited for communicating discovery type information. In some embodiments, the discovery information signals are light beacon signals.

Figure 9:
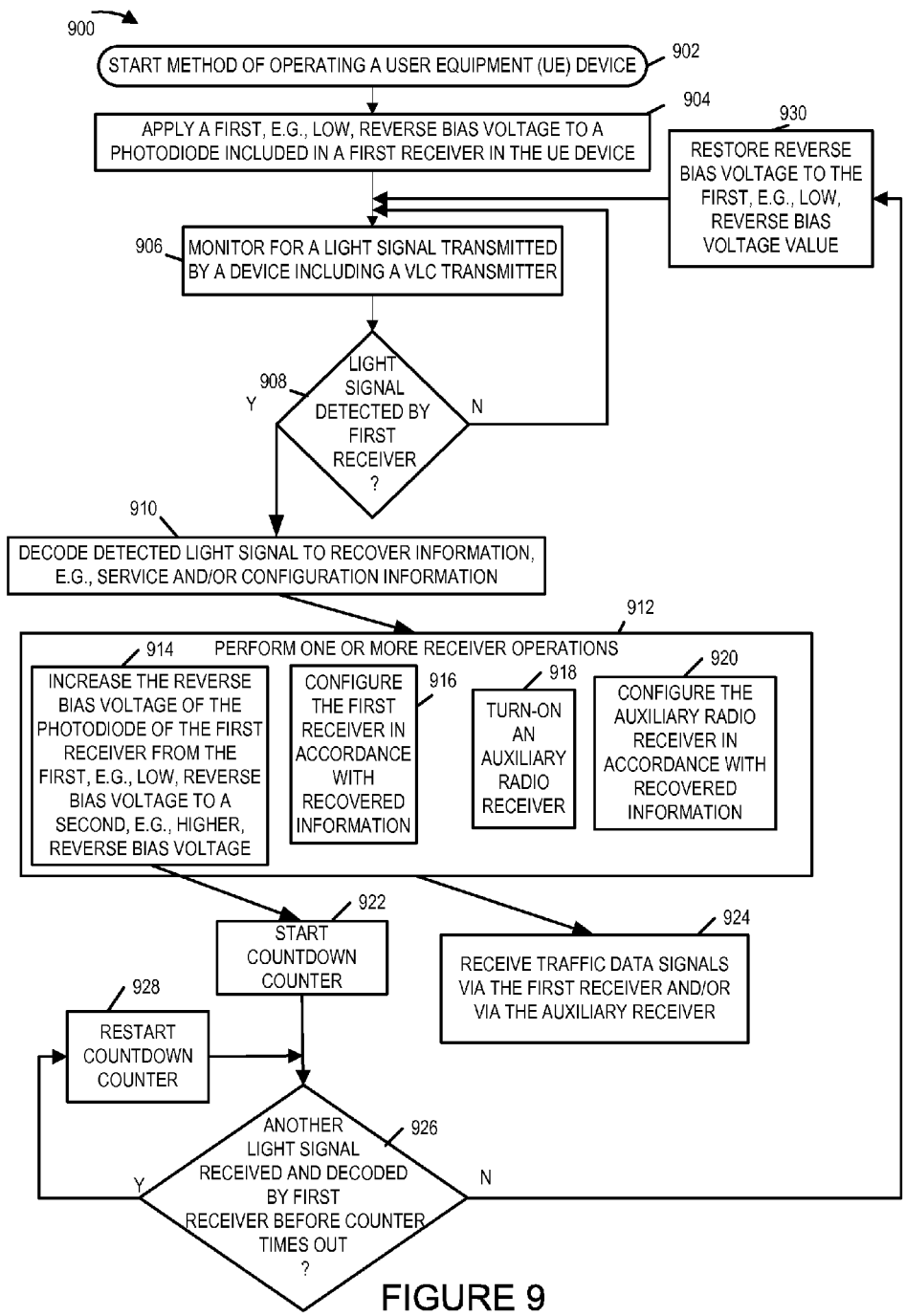
FIG. 9 is a flowchart of an exemplary method of operating user equipment (UE) device in accordance with various exemplary embodiments.

FIG. 9 is a flowchart 900 of an exemplary method of operating a user equipment (UE) device in accordance with various exemplary embodiments. The UE device is, e.g., any of the UE devices (106, 108, 110, . . . , 112) of system 100 of FIG. 1. Operation of the exemplary method starts in step 902, where the UE device is powered on and initialized. Operation proceeds from step 902 to step 904.

In step 904, the UE device applies a first, e.g., low, reverse bias voltage to a photodiode included in a first receiver in the UE device. In some embodiments, this first, e.g., low, reverse bias voltage corresponds to low power stand-by mode of operation of the UE device. In some embodiments, the level of the reverse bias voltage is as low as 0.1 V. In various embodiments, the low reverse bias level is selected based on the sensitivity level and bandwidth of the photodiode. Operation proceeds from step 904 to step 906.

In step 906, the UE device monitors for a light signal transmitted by a device including a VLC transmitter. The UE device may, and sometimes does, receive a light signal transmitted by a device including a VLC transmitter. In step 906, the UE device uses the photodiode in first receiver to receive the light signal. The device including the VLC transmitter is, e.g., an infrastructure access point (AP). In some embodiments, the infrastructure access point broadcasts, via a light signal, a service discovery signals that advertises the details about the services it offers. For example, this signal may give details about the configuration of high data rate VLC signals, e.g., which WDM bands are used, bandwidths used, and modulation that is used, as well as information about which other radio services the access point supports, e.g., Wi-Fi, 60 GHz, IR, LTE in the case of an HeNB. Operation proceeds from step 906 to step 908.

In step 908, the UE device determines if a light signal was detected by the first receiver of the UE device. If a light signal was not detected, then operation proceeds from step 908 to step 906 for additional monitoring. However, if a light signal was detected by the first receiver, then operation proceeds from step 908 to step 910 in which the UE device decodes the detected light signal to recover information, e.g., service and/or configuration information. Operation proceeds from step 910 to step 912.

In step 912, the UE device performs one or more receiver operations in response to the detected and decoded light signal. Step 912 includes steps 914, 916, 918 and 920. One or more or all of steps 914, 916, 918 and 920 are performed, e.g., depending on the recovered information from step 910 and/or capabilities of the UE device.

In step 914, the UE device increases the reverse bias of the photodiode of the first receiver from the first, e.g., low, reverse bias value to a second, e.g., higher reverse bias voltage. Operation proceeds from step 914 to step 922.

In step 916, the UE device configures the first receiver in accordance with recovered information, e.g., selecting WDM bands, setting bandwidth, identifying modulation scheme, identifying coding scheme, etc. to be able to receive and decode the VLC traffic signals transmitted by the VLC transmitter of the access point. In step 918, the UE device turns on an auxiliary radio receiver, e.g., in accordance with recovered information identifying a particular technology and/or radio communications protocol in use by the access point. In step 920, the UE device configures the auxiliary radio receiver in accordance with the recovered information, e.g., selecting a frequency, selecting a bandwidth, configuring to particular protocol, configuring for a particular data rate, configuring for a particular modulation scheme, configuring a decoder of the radio receiver, etc.

Operation proceeds from step 912 to step 924, in which the UE device receives traffic data signals via the first receiver and/or via the auxiliary receiver. If the UE device is receiving traffic signals via the first receiver, the reverse bias voltage of the photodiode of the first receiver is maintained at the second, e.g., higher, reverse bias voltage.

Returning to step 922, in step 922 the UE device starts a countdown counter. Operation proceeds from step 922 to step 926. In step 926, the UE device determines whether or not another light signal was received and decoded by the first receiver before the counter timed out. If another light signals was not received and decoded by the first receiver before the counter timed out, then operation proceeds from step 926 to step 930, in which the UE device restores the reverse bias voltage of the photodiode of the first receiver to the first, e.g., low, reverse bias value. Operation proceeds from step 930 to step 906, in which the UE device monitors for another light signal transmitted by a device including a VLC transmitter.

Returning to step 926, if in step 926 the UE determines that another light signal has been received and decoded by the first receiver before the timer timed out, then operation proceeds to step 926, in which the UE device restarts the countdown counter at the initial start value, e.g., the counter is reset. Operation proceeds from step 928 to the input of step 926.

Figure 10:
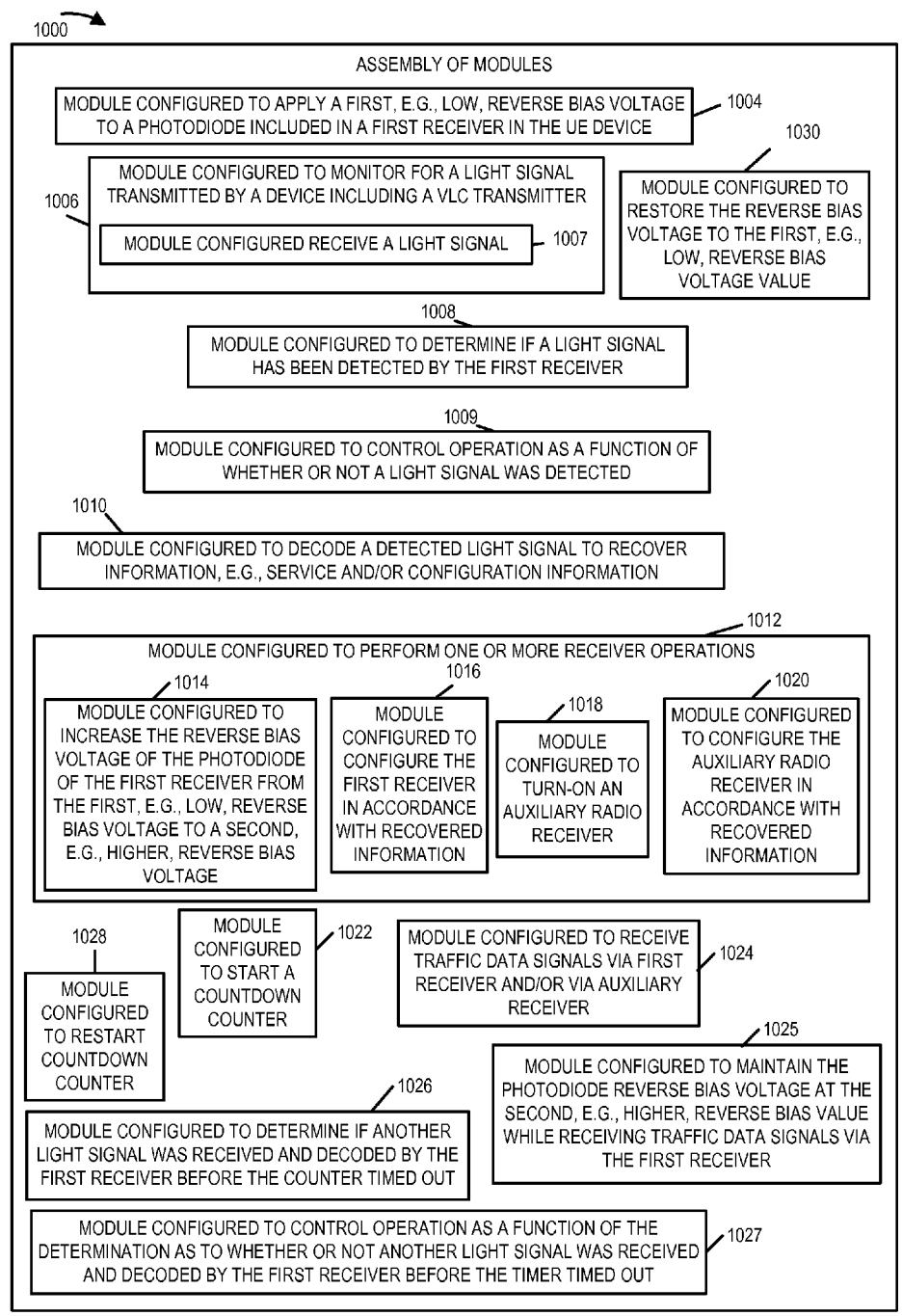
FIG. 10 is an assembly of modules which can, and in some embodiments is, used in the UE device illustrated in FIG. 3.

FIG. 10 is an assembly of modules 1000 which can, and in some embodiments is, used in the UE device 300 illustrated in FIG. 3. The modules in the assembly 1000 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. As should be appreciated the level of integration of modules on the processor and or with some modules being external to the processor may be one of design choice. Alternatively, rather than being implemented as circuits, all or some of the modules may be implemented in software and stored in the memory 304 of UE device 300 shown in FIG. 3 with the modules controlling operation of the UE device 300 to implement the functions corresponding to the modules when the modules are executed by a processor, e.g., processor 302. In still other embodiments, various modules are implemented as a combination of hardware and software, e.g., with a circuit external to the processor 302 providing input to the processor 302 which then under software control operates to perform a portion of a module's function.

While shown in the FIG. 3 embodiment as a single processor 302, e.g., computer, within device 300, it should be appreciated that processor 302 may be implemented as one or more processors, e.g., computers. When implemented in software, the modules include code, which when executed by the processor, configure the processor, e.g., computer, to implement the function corresponding to the module. In some embodiments, processor 302 is configured to implement each of the modules of the assembly of modules 1000. In embodiments where the assembly of modules 1000 is stored in memory 304, and the memory 304 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the device 300 or elements therein such as the processor 302 to perform the functions of the corresponding steps illustrated and/or described in the method of flowchart 900 of FIG. 9.

Assembly of modules 1000 includes a module 1004 configured to apply a first, e.g., low, reverse bias voltage to a photodiode included in a first receiver in the UE device, and a module 1006 configured to monitor for a light signal transmitted by a device including a VLC transmitter. Module 1006 includes a module 1007 configured to receive a light signal. Assembly of modules 1000 further includes a module 1008 configured to determine if a light signal has been detected by the first receiver, a module 1009 configured to control operation as a function of whether or not a light signal was detected by the first receiver, and a module 1010 configured to decode a detected light signal to recover information, e.g., service and/or configuration information. Module 1009 controls module 1010 to perform a decode of a detected light signal in response to a determination by module 1008 that a light signal was detected by the first receiver.

Assembly of modules 1000 further includes a module 1012 configured to perform one or more receiver operations in response to information obtained from a received detected decoded light signal. Module 1012 includes a module 1014 configured to increase the reverse bias voltage of the photodiode of the first receiver from the first, e.g., low, reverse bias voltage to a second, e.g., higher, reverse bias voltage, a module 1016 configured to configure the first receiver in accordance with recovered information, a module 1018 configured to turn on an auxiliary radio receiver, and a module 1020 configured to configure the auxiliary radio receiver in accordance with recovered information.

Assembly of modules 1000 further includes a module 1022 configured to start a countdown counter in response to module 1014 increasing the reverse bias voltage of the photodiode of the first receiver from the first to second reverse bias voltage, a module 1024 configured to receive traffic data signals via the first receiver and/or via the auxiliary receiver, and a module 1025 configured to maintain the photodiode reverse bias voltage of the first receiver at the second, e.g., higher, reverse bias voltage value while receiving traffic data signals via the first receiver.

Assembly of modules 1000 further includes a module 1026 configured to determined if another light signal was received and decoded by the first receiver before the timer timed out, a module 1027 configured to control operation as a function of the determination as to whether or not another light signal was received and decoded by the first receiver before the timer timed out, a module 1028 configured to restart the countdown timer, e.g., at its initial start value, when it is determined that another light signal was received and decoded by the first receiver before the timer timed out, and a module 1030 configured to restore the reverse bias voltage to the first, e.g., low reverse bias voltage value in response to a determination that the timer has timed out. Module 1027 controls module 1028 to restart the countdown timer in response to a determination by module 1026 that another light signal was received and decoded by the first receiver before the timer timed out.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., stationary nodes and/or mobile nodes such as mobile terminals supporting wireless communications, access points such as base stations, and/or communications systems. Various embodiments are also directed to methods, e.g., method of controlling and/or operating stationary nodes, mobile nodes, access points such as base stations, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol. Various embodiments are well suited for communications in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In some embodiments, a wireless communications device, e.g., a mobile node, which implements a method, is embedded in a vehicle. In various embodiments the mobile nodes are implemented as notebook computers, personal data assistants (PDAs), or other portable devices including receiver/transmitter circuits and logic and/or routines, for implementing the methods.

What is claimed is:

1. A method of operating a user equipment (UE) device, comprising:
    processing an output of a photodiode to detect receipt of an information signal from a light transmitter; and
    in response to detecting receipt of the information signal from the light transmitter while operating in a first mode of operation, changing from the first mode of device operation to a second mode of device operation, said second mode of device operation being a higher power consumption mode of operation than said first mode of device operation, said changing from the first mode of device operation to said second mode of device operation includes changing a reverse bias voltage applied to said photodiode from a first non-zero reverse bias voltage to a second non-zero reverse bias voltage which is higher than said first non-zero reverse bias.

2. The method of claim 1,
    wherein said first mode of device operation is a discovery mode of operation; and
    wherein said second mode of device operation is a traffic data mode of operation.

3. The method of claim 1, wherein said changing from a first mode of device operation to said second mode of device operation further includes powering a radio transmitter, included in the UE device, which is unpowered during said first mode of device operation.

4. The method of claim 2, further comprising:
    recovering device configuration information from said information signal; and
    wherein changing from said first mode of device operation to said second mode of device operation includes configuring a receiver, included in the UE device and used during said traffic data mode of operation in accordance with said recovered device configuration information.

5. The method of claim 2, wherein changing from said first mode of device operation to said second mode of device operation includes configuring a receiver feature used during said traffic data mode of operation based on configuration information communicated by light signals received during said first mode of device operation, said configuration information including information indicating Wavelength Division Multiplexing (WDM) bands used to communicate data using light signals during said traffic data mode of operation.

6. The method of claim 2, wherein changing from said first mode of device operation to said second mode of device operation includes turning on radio circuitry, included in the UE device and corresponding to radio channels which are indicated to be supported by the sender of light signals received during said first mode of device operation.

7. The method of claim 6, wherein said radio channels are used by an access point from which light signals were received during said first mode of device operation, said radio channels being used to communicate user data between said UE device and the access point from which the light signals were received.

8. The method of claim 7, wherein said received light signals indicate one of plurality of communications protocols used to communicate with said access point.

9. The method of claim 1, wherein changing from said first mode of device operation to said second mode of device operation is performed in accordance with a communications schedule including discovery intervals in which said first mode of device operation is used and traffic data intervals during which said second mode of device operation is used.

10. The method of claim 9, wherein changing from said first mode of device operation to said second mode of device operation is contingent upon said schedule and the receipt of a light signal from an access point which can support the communication of user data during said second mode of device operation.

11. A user equipment (UE) device, comprising:
means for converting visible light signals into electrical signals;
means for processing an output of said means for converting visible light signals into electrical signals to detect receipt of an information signal from a light transmitter; and
means for changing from a first mode of device operation to a second mode of device operation in response to detecting receipt of the information signal from the light transmitter, said second mode of device operation being a higher power consumption mode of operation than said first mode of device operation, said means for changing from a first mode of device operation to said second mode of device operation include means for changing a reverse bias voltage, applied to said means for converting visible light signals into electrical signals, from a first non-zero reverse bias voltage to a second non-zero reverse bias voltage which is higher than said first non-zero reverse bias.

12. The UE device of claim 11,
wherein said first mode of device operation is a discovery mode of operation; and
wherein said second mode of device operation is a traffic data mode of operation.

13. The UE device of claim 11, wherein said means for changing from a first mode of device operation to said second mode of device operation further includes means for powering a radio transmitter which is unpowered during said first mode of device operation.

14. The UE device of claim 12, further comprising:
means for recovering device configuration information from said information signal; and
wherein said means for changing from said first mode of device operation to said second mode of device operation includes means for configuring a receiver, included in the UE device and used during said traffic data mode of operation in accordance with said recovered device configuration information.

15. The UE device of claim 12, wherein said means for changing a mode of device operation from said first mode of device operation to said second mode of device operation includes means for configuring a receiver feature used during said traffic data mode of operation based on configuration information communicated by light signals received during said first mode of device operation, said configuration information including information indicating Wavelength Division Multiplexing (WDM) bands used to communicate data using light signals during said traffic data mode of operation.

16. A computer program product for use in a user equipment (UE) device, the computer program product comprising:
a non-transitory computer readable medium comprising:
code for causing at least one computer to process an output of a photodiode to detect receipt of an information signal from a light transmitter; and
code for causing said at least one computer to change from a first mode of device operation to a second mode of device operation in response to detecting receipt of the information signal from the light transmitter, said second mode of device operation being a higher power consumption mode of operation than said first mode of device operation, said changing from the first mode of device operation to said second mode of device operation including changing a reverse bias voltage applied to said photodiode from a first non-zero reverse bias voltage to a second non-zero reverse bias voltage which is higher than said first non-zero reverse bias.

17. A user equipment (UE) device comprising:
at least one processor configured to:
process an output of a photodiode to detect receipt of an information signal from a light transmitter; and
change from a first mode of device operation to a second mode of device operation in response to detecting receipt of the information signal from the light transmitter, said second mode of device operation being a higher power consumption mode of operation than said first mode of device operation, said processor being configured to change a reverse bias voltage applied to said photodiode from a first non-zero reverse bias voltage to a second non-zero reverse bias voltage which is higher than said first non-zero reverse bias, as part of being configured to change from the first mode of device operation to said second mode of device operation; and
memory coupled to said at least one processor.

18. The UE device of claim 17,
wherein said first mode of device operation is a discovery mode of operation; and
wherein said second mode of device operation is a traffic data mode of operation.

19. The UE device of claim 17, wherein said at least one processor is further configured to power a radio transmitter included in the UE device, which is unpowered during said first mode of device operation, as part of being configured to change from a first mode of device operation to said second mode of device operation.

20. The UE device of claim 18, wherein said at least one processor is configured to:
  recover device configuration information from said information signal; and
  wherein said at least one processor is configured to configure a receiver, included in the UE device and used during said traffic data mode of operation in accordance with said recovered device configuration information, as part of being configured to changing from said first mode of device operation to said second mode of device operation.

* * * * *